May 1, 1934.  J. J. LERAY  1,957,277
HELICOPLANE AND ALLIED AIRCRAFT
Filed Dec. 1, 1933  5 Sheets-Sheet 1

INVENTOR
Joseph J. Leray
ATTORNEY

May 1, 1934.  J. J. LERAY  1,957,277
HELICOPLANE AND ALLIED AIRCRAFT
Filed Dec. 1, 1933  5 Sheets-Sheet 2

INVENTOR
Joseph J. Leray
ATTORNEY

May 1, 1934.    J. J. LERAY    1,957,277
HELICOPLANE AND ALLIED AIRCRAFT
Filed Dec. 1, 1933    5 Sheets-Sheet 3

Inventor:
Joseph J. Leray

May 1, 1934. J. J. LERAY 1,957,277
HELICOPLANE AND ALLIED AIRCRAFT
Filed Dec. 1, 1933  5 Sheets-Sheet 4

INVENTOR
Joseph J. Leray

May 1, 1934.　　　J. J. LERAY　　　1,957,277
HELICOPLANE AND ALLIED AIRCRAFT
Filed Dec. 1, 1933　　　5 Sheets-Sheet 5

Inventor:
Joseph J. Leray

Patented May 1, 1934

1,957,277

UNITED STATES PATENT OFFICE 1,957,277

HELICOPLANE AND ALLIED AIRCRAFT

Joseph J. Leray, West Warwick, R. I.

Application December 1, 1933, Serial No. 700,508

6 Claims. (Cl. 244—15)

The invention relates to improvements in helicoplanes, most of said improvements being also applicable to airplanes and blimp-airplanes.

*First.*—By increasing the lift of said named aircrafts by a wing of a multi-airfoil type, which gives an effective aspect ratio much larger than a solid section and gives the benefit of slots on a large scale.

*Second.*—By increasing the stability of said aircrafts in stalled condition as the air escaping thru the slots of the wing will have the effect of a parachute.

*Third.*—By increasing on a wing the area favorable to artificial suction.

*Fourth.*—By increasing and improving the controllability and maneuverability at low or zero speed by discharging air currents thru the tail surfaces and regulating the suction on the wing.

*Fifth.*—By increasing the thrust of the propeller by applying suction to retard the slipstream.

*Sixth.*—By improving the torque effect with the use of tandem propellers and tandem airscrews rotating in opposite directions.

*Seventh.*—By direct-lift obtained by two superimposed airscrews of different size and of semiflexible type driven from the slipstream and applied power.

*Eighth.*—By reducing the length of the run in the take-off or landing on land and much more on water by direct-lift developed by air currents discharged under the aircraft close to the ground or the water.

*Ninth.*—By developing an hybrid aircraft combining blimps and airplanes, having performances better than the originators: the airplane and the dirigible balloon.

*Tenth.*—By developing for said blimp-airplanes means to brake and anchor them temporarily on the ground with sucking cups.

The helicoplane related to this invention has a wing sufficient to support and fly the aircraft fully loaded without the help of the airscrews, which are auxiliary equipments for landing in a restricted area, the omission of said airscrews leaving the aircraft complete as an airplane or seaplane.

The increased lift claimed by the invention in combining several airfoils to form a wing rests on the experimentally proven gain in lift obtained by slots, large aspect ratio and added compression developed under the wing without increasing either the angle of attack or the drag.

The special aerodynamics involved in this multi-airfoil wing are first an increased compression under the airfoil when said airfoil is followed closely by another airfoil at a lower plane, as the air coming to said following airfoil is retarded and deflected up crowding the molecules under the airfoil ahead, two adjacent airfoils being positioned to leave a gap or slot between them thru which the air compressed under the forward one finds its natural passage and acquires more speed from the compression. After passing the slot with an increased velocity the air produces a greater deflection over the second airfoil resulting in a higher rarefaction or negative pressure. Thus the lift being increased by the combination in both ways: from the compression and depression or positive and negative pressure. The trailing edge of the first airfoil being placed ahead and over at such a distance from the leading edge of the following one to permit a perfect deflection over the leading edge and camber of said second airfoil to obtain the maximum suction lift.

It is well known that said suction lift is high only a short distance behind the leading edge, only where the deflection of the air flow reacts against the atmospheric pressure effectively, whereof the greater the length of leading edge to the total surface of the wing, the more the efficiency of said wing to develop negative pressure or suction, this being known as the advantage of a large aspect ratio in a wing. In a multi-airfoil wing the advantage of the leading edge is repeated to each airfoil and the aspect ratio of such a wing being really the sum of the length of all the airfoils by the total surface of the wing. While the drag may become slightly increased on viscosity consideration, it will be greatly reduced by the possibility to set each airfoil at a smaller angle of incidence than in a wing of solid section to obtain the same lift and a decreased resistance will result from the escape of the air thru the slots.

In a drop or stall, the air escaping easily between the several airfoils of the wing eliminates the tendency of the air to upset the aircraft as occuring when the air is forced to go around the edge of the wing, a parachute effect is thus obtained which will restore quickly an aircraft on its keel, the slots acting in a wing in the same manner as the hole on the top of a parachute making the sinking speed of the wing less than that of the body or fuselage.

The efficiency of the slots is increased by a flexible membrane or frieze attached to the trailing edge of the forward airfoil moving up and down as the air pressure or the direction of the relative wind change, producing variation in the gap of the slot.

As each airfoil in a wing produces a separate deflection accompanied with successive high negative pressure areas, said wing provides a marked improvement for application of artificial suction on the upper surface by series of valves along each airfoil. The large effect of the suction on the wing furnishes in turn a reliable positive lateral control under regulation with registers functioning with the ailerons.

The sucking device, a fan and blower combination, discharges continually a strong air current thru the tail surfaces and assures a perfect positive control at all speeds. Said fan and blower combination provides from the air exhausted a direct-lift, being specially valuable when landing either on land or water, the benefit being still more appreciable for the take-off from the water as the powerful air current blown closely over the water surface causes the water to yield down and depresses the aircraft at the aft, putting said aircraft at a greater angle of attack and at the same time raising it from the water immediately whereof the water resistance will be considerably decreased and the take-off run substantially shortened.

If a huge airplane as outlined in this invention carries a large gas bag or blimp on its back, by simple evolution a blimp-airplane is created having sustaining means derived from both the lighter and heavier than air type. Said hybrid aircraft called blimp-airplane will naturally from lack of total buoyancy stay on the ground at rest, but will take the air with very little dynamic lift.

Said blimp-airplane is a natural development of the present invention, regarding multi-airfoil wing, suction and air control, as having from said invention the very necessary means of construction and control in the air or on the ground: in the air by the powerful air current developed by suction drawn from the wing and discharged thru the control surfaces at the tail, effecting a very efficient positive control regardless the speed of the aircraft in flight, on the ground by diversion of the suction from the wing to the legs carrying the landing gear, said legs having around the wheels large rubber cups which will come into contact with the ground and adhere to it strongly under the suction, resulting in a powerful braking and temporarily anchoring the blimp-airplane on the ground till it is permanently tied to its mooring.

The blimp-airplane is a great improvement over the ordinary dirigible as it eliminates the need of a ground crew and will turn an enormous amount of dead or parasite drag of a dirigible into useful lift by shaping a part of the gas containers into a wing. With more lift, larger power plant and more useful load will be permissible to be carried at a considerably higher translation speed.

The invention also improves the lift of an ordinary airscrew by making the blades of multi-airfoil form similar to the wing referred to above. Said airscrew is driven by the slipstream and the power plant or by the slipstream alone, the slipstream acting directly on the blades when passing on the rear and indirectly from the energy of a turbine or rotor turning freely in the slipstream. Improvement in efficiency and stability is obtained by balancing the torque in rotating simultaneously in opposite direction thru a differential gear system two superimposed airscrews of different size and speed. The construction is semi-flexible to reduce the weight to a minimum, as in that type the major part of the strain and shearing force are taken up by the centrifugal force developed by the rotation.

The invention is illustrated in the accompanying drawings in which, Fig. 1 is a front view of a large amphibian helicoplane with a single body or hull and two power units.

Figure 3:
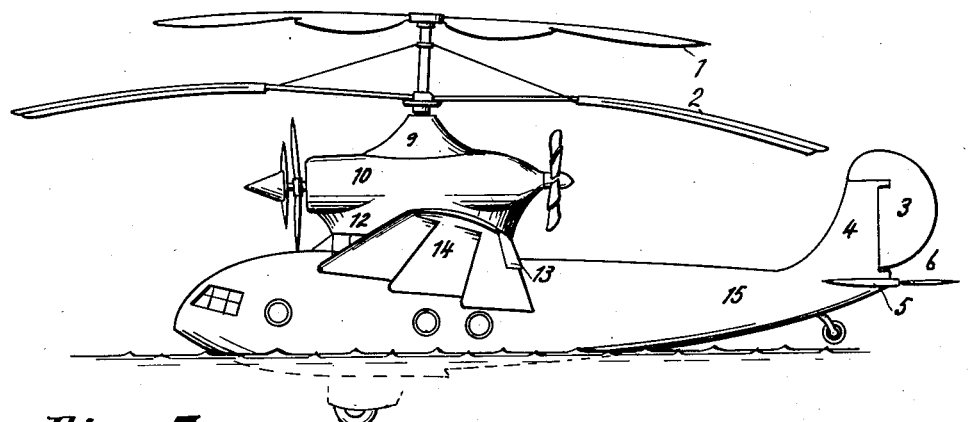
Fig. 3 is a profile view of a sea-helicoplane with a single power unit and a twin hull, convertible into an amphibian.

The invention is fully illustrated in the sea-helicoplane shown on Fig. 3. Said sea-helicoplane is formed by two hulls 15, Figs. 3 and 4, leaving between them a distance approximately equal to the diameter of the propeller, said hulls being solidly attached to the wing, 14, and supporting the aircraft on water. The power unit is composed of two motors, 23 and 24, Fig. 4, carried inside a tube or cylinder, 10, Fig. 3, mounted on the center of the wing with a streamlined base, 12, establishing inside communication between the tube, 10, and the wing, 14. The front end of the tube is open while the rear end terminates to a point on which is mounted an air turbine, 11, working in the slipstream, whose energy is delivered to the airscrew by gears, 28 and shaft, 99. Two superimposed airscrews, 1 and 2, are mounted on the tube with separate shafts one inside the other, the lower and larger airscrew, 2, being fastened to the hollow shaft, 25, Fig. 4, while the smaller or top airscrew, 1, is mounted on the inside shaft, both having their hub, 19 and 20, Fig. 4, respectively secured to their own shaft.

Figure 8:
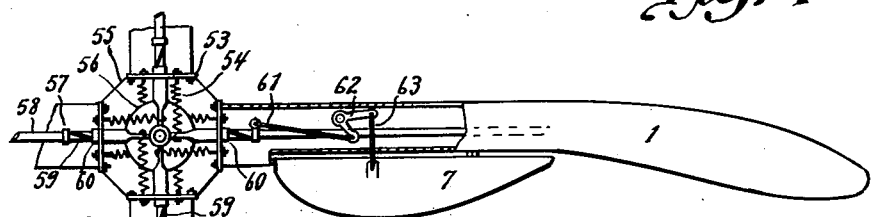
Fig. 8 is a detailed view of the smaller airscrew, showing the construction to obtain a feathering system.

The smaller airscrew is formed by a central hub or metal disc, 56, Fig. 8, to which are secured radially four semi-flexible axles, 58, each carrying a semi-flexible blade, 1, having a flap, 7, hinged to its trailing edge. The blade is mounted on the axle, 58, free to turn and slide, both motions being regulated by a plate, 53, Fig. 8, bolted to the blade having a collar, 60, with inside spurs engaging in spiralled grooves, 59, made on the root of the axle up to a stop, 57, fastened to said axle, 58; said stop serving also to attach a rod, 61, articulated with a bell crank, 62, to operate the flap, 7, appended to the blade, 1. At rest the blade is drawn against the hub pan, 55, by a pair of tension springs, 54, attached to the plate, 53, at one end and to the next axles on the hub at the other end. The centrifugal force of the rotation draws the blade out changing the angle of incidence, as the spurs on the collar, 60, are forced to follow the grooves on the axle, 58. In going out the blade carries the bell crank, 62, with it, one arm of said bell crank being attached to the axle with a rod, 61, said bell crank is forced to turn pushing the other rod, 63, attached to the flap throwing the flap down; reversely the flap will be pulled up with the return of the blade toward the hub. A removable cover not represented protects the hub assembly and keeps the lubricant from dust or foreign matter.

Figure 9:
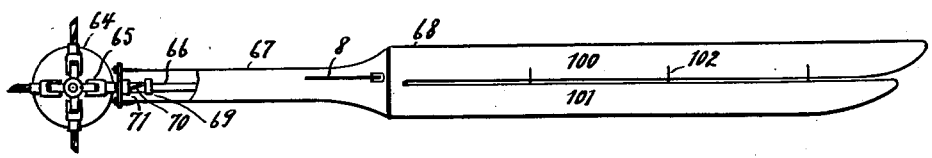
Fig. 9 is a detailed plan view showing the special features of the blade in the larger airscrew.

The lower or large airscrew is formed by a two-airfoil blade, Fig. 9, carried on a short rigid axle, 66, hinged to the hub, 65, the blade being flexible past the end of the axle out to the tip. Two airfoils, 100 and 101, are kept at a designated distance from each other by suitable ties, 102, spaced along said airfoils. The weight of the blade at rest is carried by a cable, 8, fastened to the vertical shaft, 25, above with springs, 104, and to the trailing edge of the blade, pulling said trailing edge upward when the blade goes down. The angle of incidence is regulated by a sliding collar, 71, Fig. 9, at the root similarly as the small airscrew described above.

The flexibility of said airscrews will permit them to choose an horizontal attitude along the direction of the component force derived from the lift and centrifugal force whereof the strain imposed on the structure will be mostly in tension, hence light structure being permissible.

Figure 4:
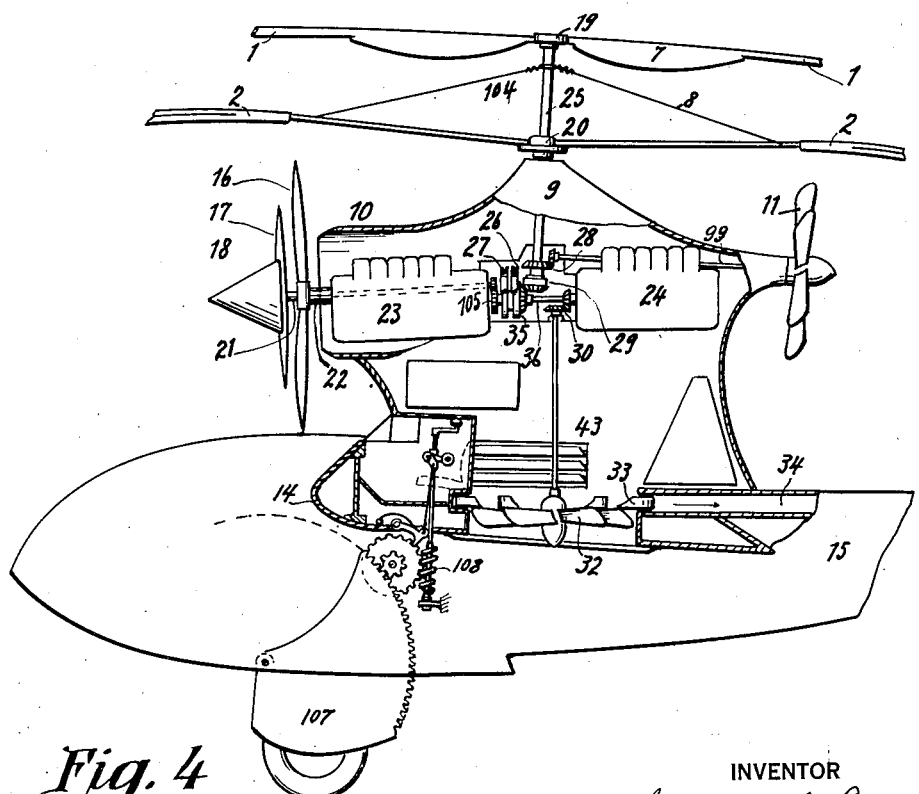
Fig. 4 is a detailed view of the mechanical arrangement of the sea-helicoplane shown on Fig. 3.

The hollow vertical shaft, 25, Fig. 4, carrying the large airscrew extends from the transmission up to the hub of the small airscrew, 19, and is supported on ball or roller bearings by a turret, 9, fixed on the cylinder, 10; the inner vertical shaft carrying the small airscrew emerges at both ends of the hollow shaft, being mounted on suitable bearings on said vertical shaft. A differential gear, 29, Fig. 4, of a planetary system distributes the power between the two airscrews, in which the annular gear is driven, the sun gear drives the small airscrew and the planet gears drive the large airscrew, whereof the airscrews will continue to turn even if the motor, 24, and annular gear, 26, are stopped. The air turbine, 11, delivers its energy to the large airscrew by an additional gear, 28, attached above the planetary system, 29, said gear engaging the pinion gear fixed on the shaft, 99, of the turbine.

Two motors form the power plant, the forward motor, 23, drives the large propeller, 16, fixed at the end of a hollow shaft, 22, geared to said motor, the second motor, 24, is positioned behind the first mentioned motor at a distance sufficient to house conveniently the transmission system distributing the power of said second motor to drive simultaneously or alternatively the pumping device, 32, 33, the small propeller, 17, and the airscrews; the pumping device being geared, 30, directly to the crank shaft, 36, while the propeller and airscrews are connected to the motor by a planetary differential gear system, 35, where a pinion gear fixed on the crank shaft forms the sun gear, the planet gears drive the small propeller thru an additional gear, 105, and the annular gear drives the airscrews; said annular gear and planet gears having each a drum with braking bands, 26 and 27, permitting to stop alternatively the power from the small propeller, 17, or the airscrews, the shaft, 21, of the small propeller, 17, passing from the transmission to the front thru the hollow shaft, 22, of the large propeller. A spinner, 18, is attached in front of the small propeller, 17, to deflect the incoming air flow toward the tip of the propellers and prevent a direct entry into the tube, 10, housing the motors.

Figure 6:
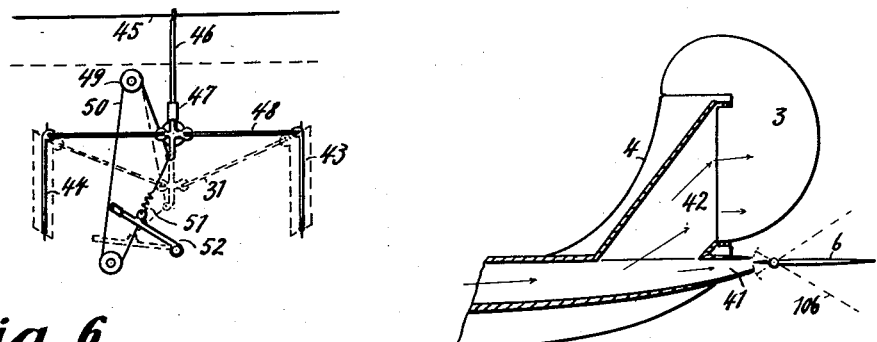
Fig. 6 is a diagram of the system regulating the suction in the wing with registers.
Figure 7:
Fig. 7 is a detailed view showing the method of discharging the air thru the tail surfaces.

At the center of the wing directly under the motors is located the pumping device set nearly flush with the lower surface of said wing. The pumping device is formed by a fan, 32, and a blower, 33, combined, the fan discharging the air downwardly between the two hulls, while the blower paddles attached on the tip of the fan blades discharge the air sternwardly thru a double conduit, 34, Fig. 4, built on the top of the hulls, 15, exhausting at the tail thru slots arranged at the trailing edge of the vertical and horizontal fins, 41 and 42, Fig. 7, right on the rudders, 3, and elevators, 6; said rudders and elevators being hinged some distance behind their leading edge to balance their load and at the same time shift the discharged air current entirely to one side or the other as the rudders and elevators are deviated out of their neutral position, 106, Fig. 7. The purpose of the pumping device is to develop the suction on the wing and around the propellers, to provide a cooling system for the power plant and maintain a positive control independent of the speed of the aircraft. The air is admitted to the pumping device thru the tube, 10, containing the power plant and thru the upper surface of wing with series of valves, 39, Fig. 5, installed along the span, one row to each airfoil, 36, 37 and 38; the incoming air being led to the pumping device by inside conduits embodied in the structure of the wing and making part of it. The air coming to the pumping device from the wing is regulated by two registers, 43 and 44, Fig. 6, one for each side; said registers being operated by a bar, 46, Fig. 6, attached to the cables, 45, interconnecting the two ailerons, 13, Fig. 3. Said bar is held by a pivoted sleeve, 47, in which it can slide, the other end of the bar being attached to a control lever, 52, with cables, 50, on pulleys, 49, and a spring, 51, to take up the slack. The work of the control lever is to slide the bar, 46, in the sleeve, 47, bringing it in nonoperative condition as on Fig. 6 where the rods, 48, connecting the registers are brought close to the sleeve. Said non-operative condition keeps both registers shut and neither will open by the movement of the ailerons. When the control lever pulls the bar and brings the rods, 31, connected to the registers away from the sleeve, 47, it opens both registers and then the displacement of the ailerons will close the registers alternatively on the side on which the aileron is turned up; the function of said registers being to control the aircraft laterally by unbalancing the lift obtained from the suction on the wing. The air can enter the wing thru the valves, 39, but cannot escape out from the wing.

Figure 5:
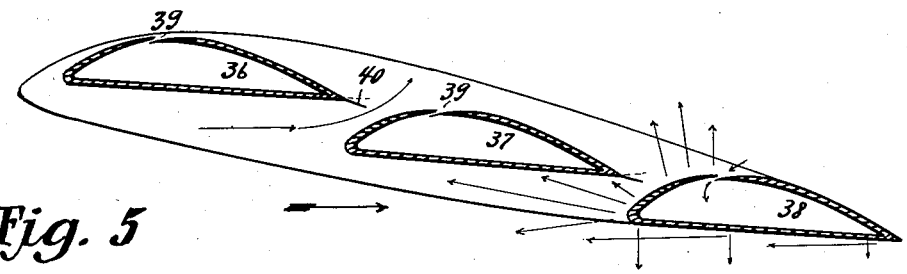
Fig. 5 is a detail view of the wing section.

The three airfoils, 36, 37, and 38, forming the wing are distanced and positioned to make a slot between them, the two forward airfoils, 36 and 37, having their trailing edge in the slots, have appended on said trailing edge a flexible membrane or freeze, 40, rising up and increasing the gap of the slots under the pressure of the air, whereof the resistance will be eased off between the airfoils and a larger volume will pass the slots over the following airfoils resulting in larger rarefaction or negative pressure. The arrows in Fig. 5 represent graphically: the direction of the relative wind,—the flow thru the slots,—the deflection,—and the reaction transmitted ahead in opposite direction thru the molecules of the air approaching the airfoils.

The above described sea helicoplane becomes an amphibian when a suitable folding landing gear, 107, is added, as shown on Fig. 4, with suitable means, 108, to retract the same in flight or on water.

Figures 1, 2:
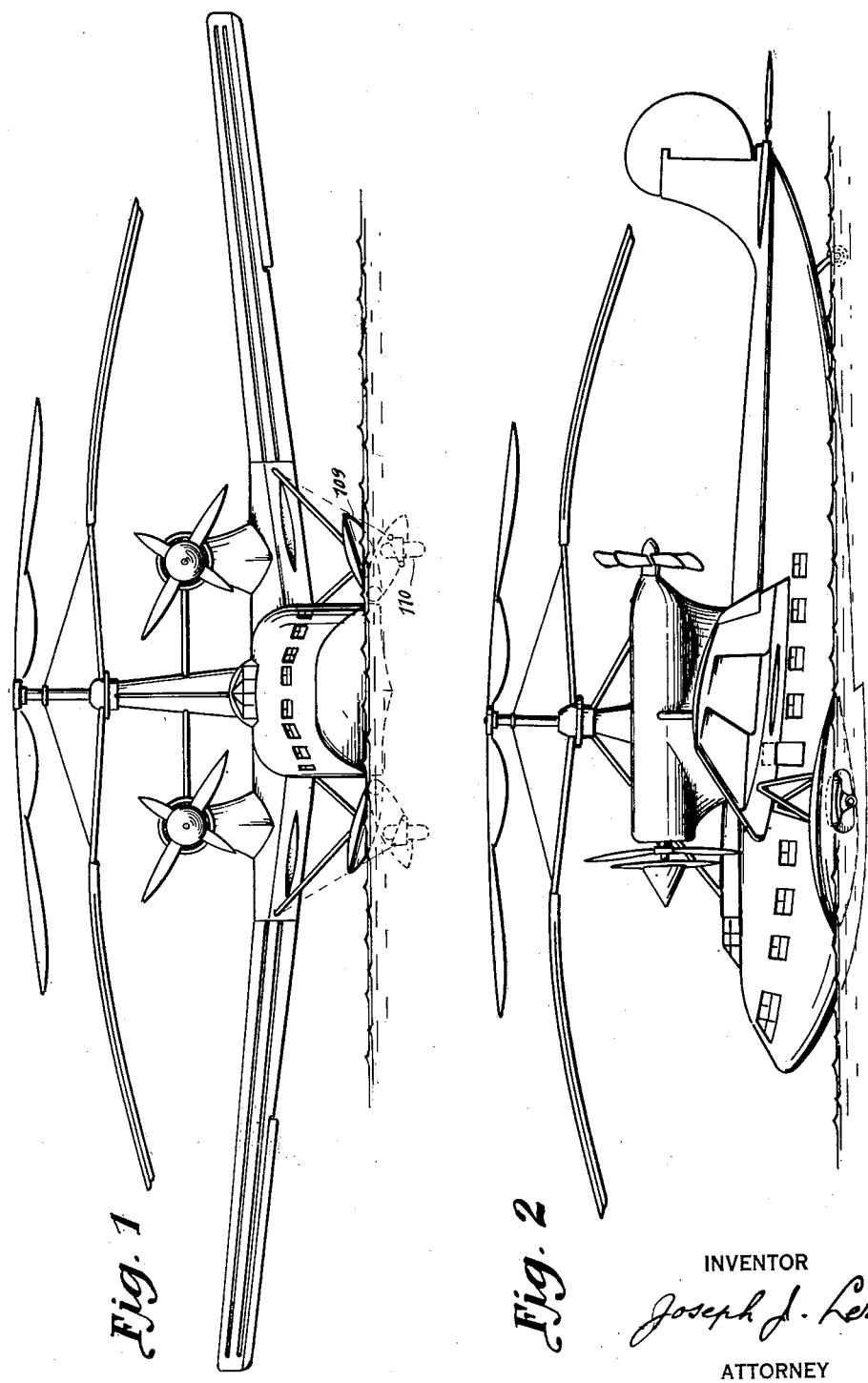
Fig. 2 is a profile view of the same helicoplane shown on Fig. 1.

It is not the intent of this specification to limit the application of said invention to the helicoplane described above, as larger ones with several power units may be constructed with modification of the body or hull to suit, as such a larger amphibian helicoplane is shown on Figs. 1 and 2, having two power units, a single hull with side floats, 109, hinged near the bottom of the hull, said floats carrying wheels, 110, folding in.

Several other alternative designs are possible when smaller, lighter or low speed helicoplanes are desired; for this purpose an helicoplane may have a single propeller, the second motor being smaller and driving only the pumping device and airscrews. For a still lighter one, no direct power will be applied to the airscrews, said airscrews turning only from the energy of the slipstream. Other light helicoplanes can be constructed with a single airscrew of either type, specially when no power is applied.

Figure 10:
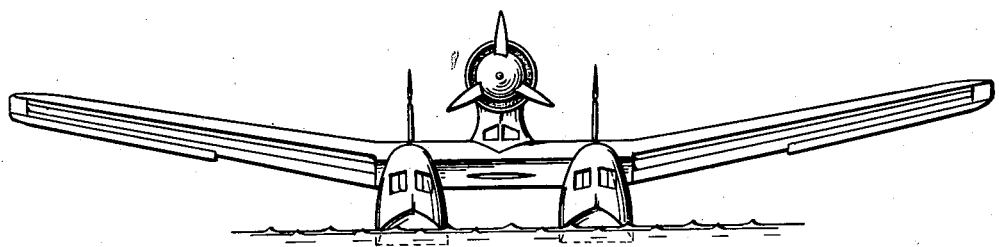
Fig. 10 is a front view of a seaplane identical in design to the helicoplane shown on Fig. 3 minus the airscrew.
Figure 11:
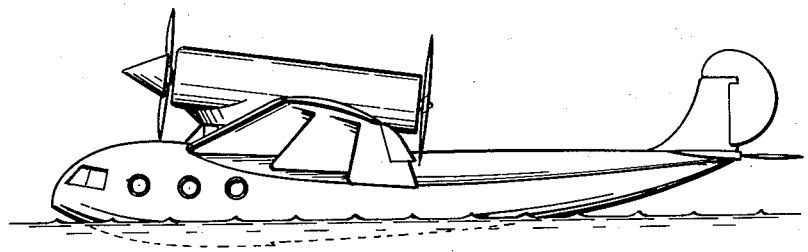
Figs. 11 and 12 are respectively a profile view and a plan view of the seaplane shown on Fig. 10.
Figure 12:
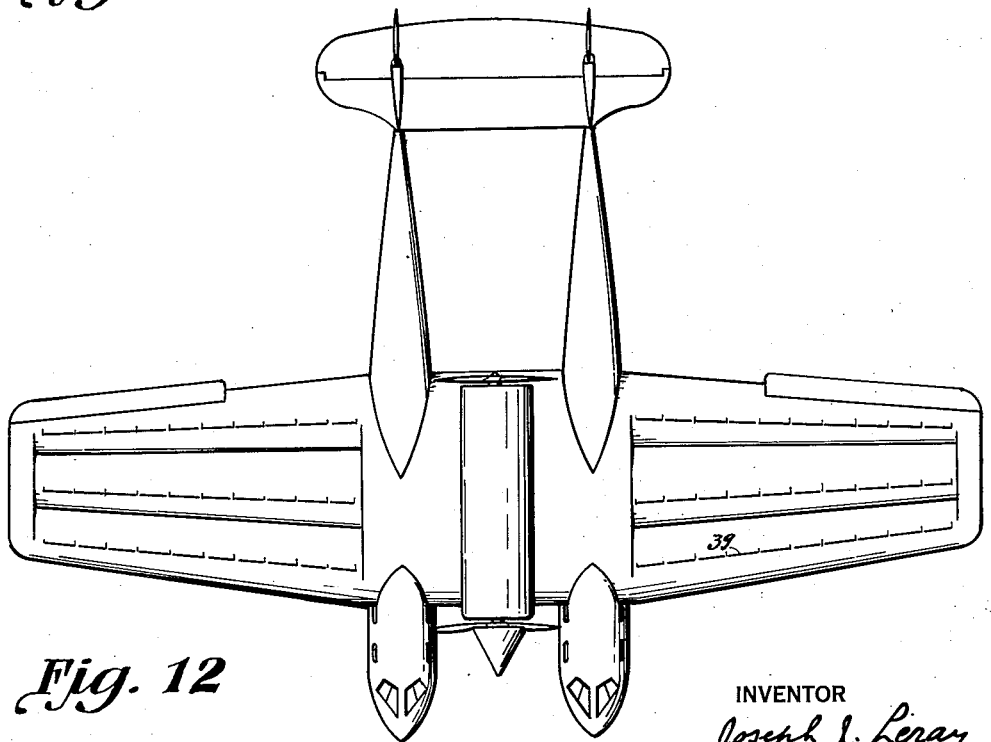

Many features of the invention find application in other aircrafts. Figs. 10, 11, and 12 show a seaplane almost identical to the helicoplane shown on Fig. 3, with the airscrews excepted, the multi-airfoil wing, the mode of suction and the positive air control being respectively the same in both aircrafts and for the same purpose.

Figure 13:
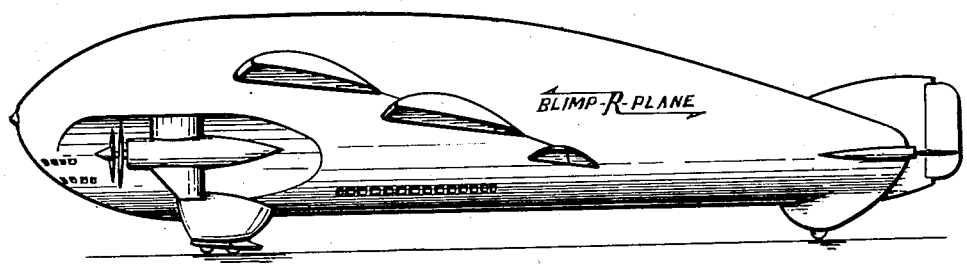
Fig. 13 is a blimp-airplane shown in profile embodying the same features as the helicoplanes and seaplane shown on Figs. 3 and 10 respectively.
Figure 14:
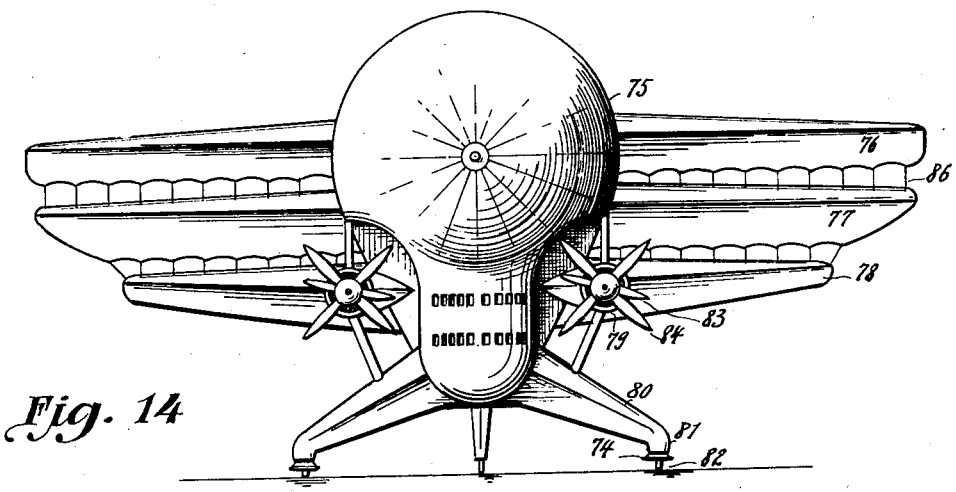
Figs. 14 and 15 are respectively a front view and a plan view of the blimp-airplane shown on Fig. 13.
Figure 15:
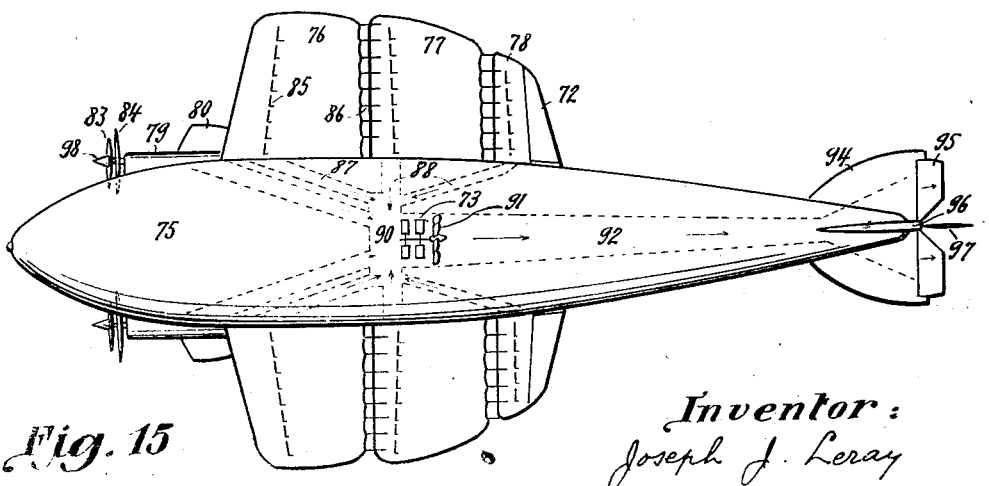

By simple evolutions of the airplane a huge aircraft of the airplane type may have an enlarged fuselage and a short thick wing of the multi-airfoil type; said large fuselage and thick wing may contain gas bags to support the greater part of the weight, and from said evolutions a blimp-airplane is created which has a wing, a power plant and a control system like the airplane and helicoplanes described above. Said blimp-airplane, shown on Figs. 13, 14, and 15, has a multiairfoil wing, each airfoil, 76, 77, and 78, having a rigid conduit with air valves, 85, along the span, said conduit forming the spar of the wing and being lodged behind the leading edge, the rest of the airfoil being formed by a suitable gas bag held and shaped by an external envelope fastened by cables, 86, from the spar or conduit of one airfoil to the spar of the next airfoil. The last and smaller airfoil, 78, contains no gas but has suitable ailerons, 72 instead. The driving power plant is in two units mounted inside of tubes or cylinders, 79, like in the helicoplanes described above, but having as many more motors as necessary to drive two giant propellers, 83 and 84, in close tandem, in front of each tube, and drive also a pumping fan between the motors in the tubes to throw the suction around the propellers and cool the motors.

A powerful pumping device, 91, is installed inside the fuselage pumping the air out of a central chamber, 90, blowing away sternwardly thru a large conduit, 92, leading to the tail surfaces, 94 and 96, discharging thereout thru the fins on the rudder, 97, and elevators, 95, in the same manner and for the same purpose as in the helicoplanes described above. All the conduits lead the air to the central chamber, 90. Said conduits put the central chamber in communication respectively with each airfoil, with the tubes containing the driving motors and with two legs, 80, carrying the landing gear, 82. Registers are installed in the inlets of the conduits around the central air chamber to control the suction on the wing, stop the suction around the propellers on landing and divert the suction from the wing to the legs in landing or special maneuvers in flight. The pumping device is formed by a large fan, 91, driven by several motors, 73.

In this blimp-airplane the air conduits form the principal structure to which others are attached as to main beams. The propellers are in pairs of unequal diameter: the larger ones, 84, being mounted and driven by hollow shafts on suitable bearings and geared to several motors; the smaller propellers 83, rotate in front of the large ones in opposite direction mounted on a separate shaft turning inside the hollow one and driven by a separate group of motors behind the first group all inside the tubes. Said shafts of the small propellers drive also a pumping fan inside the tubes between the two groups of motors; the air discharged by said fans in the tubes is sent to the central air chamber to be pumped again by the pumping device.

The landing gear, 82, is carried by side fins designated as legs, 80, said legs forming large streamlined pants, 81, covering the wheels, 82. The bottom edge of said pants is of elastic material, rubber or like, forming a cup, 74, held close to the ground nearer behind the wheels than in the front of said wheels. Said cups are made to stretch down easily and have communication thru the legs with the inside pumping device by inside conduits built in said legs. When the controlling registers divert the suction thru the legs to said cups, the cups sink down and come in contact with the ground all around except a small portion in front of the wheels. From this cupping action a powerful means of braking and anchoring the aircraft is provided and no need of land crew will be necessary to land the aircraft. After landing, the blimp-airplane is held temporarily fast by suction till it is tied permanently to its moorings.

The improvements of the blimp-airplane over an ordinary dirigible balloon are obvious, an enormous amount of parasite drag will be converted into useful lift, it will combine the respective advantage of the lighter and heavier than air in a single aircraft much more maneuverable and convenient with considerably more speed and useful load carrying capacity.

From the above description of my invention, I claim:

1. In aircrafts of the helicoplane, airplane and blimp-airplane type, a wing formed by several airfoils positioned in steps going down toward the trailing edge of said wing, said airfoils being separated by a gap or slot, a flexible membrane or frieze appended to those airfoils having their trailing edge in the slots, air conduits built and imbedded in said airfoils having a series of valves drawing the air by suction into said conduits from the upper surface thereof, a pumping device developing internal suction in the wing and in cylinders housing the motors, registers regulating, diverting or stopping said suction in the wing, other conduits imbedded in the fuselage terminating in slots at the tail thru the trailing edge of the vertical and horizontal fins and releasing thereout sternwardly a part of the air discharged by the pumping device, rudders and elevators lying in said discharged air currents, having their hinge joints some distance back of their trailing edge to effect a balanced load and shift the whole stream on one side of said rudders and elevators when deviated by the control from their neutral position, motors substantially mounted inside of cylinders, a pumping device and propellers rotating in opposite direction in tandem both driven by said motors, a system to operate the above-mentioned registers with the normal control of the ailerons, comprising a bar sliding in a pivoted sleeve, one end of said bar being attached to the cables interconnecting the ailerons and the other end being articulated with the registers by rods, a control lever being provided to slide said bar in the sleeve by means of attaching cables and pulleys with a spring to take up the slack, wherefrom the advance of said control lever both registers become and stay closed and with said lever pulled back the two registers stay open when the ailerons are in neutral position, but close alternatively on the side on which the aileron is turned up, thus effecting a dual lateral control from the ailerons and the suction.

2. In aircrafts of the helicoplane type having a multiairfoil wing, a suction system and a positive air control each respectively as in claim 1; a cylinder, housing the power plant, solidly fixed on a streamlined base over the center of the wing establishing interior communication between said wing and the cylinder, two motors substantially mounted inside said cylinder: one driving a tractor propeller with a front spinner, the other driving the pumping device thru suitable gears and shafts, a pumping device of a fan and blower combination discharging partly under the wing between the hulls and partly thru the tail surfaces for control, a streamlined turret fixed over the cylinder holding on suitable bearings a vertical shaft carrying an airscrew secured to said shaft rotating over said turret, an airscrew formed by axles radially hinged to a hub and semi-flexible blades of the multi-airfoil type carried on said axles with slidable bearings, cables attached to springs some distance above the hub on an extension of the vertical shaft, said cables being attached to the blades at their other end supporting said blades at rest and holding their trailing edge slightly turned up, slidable bearings formed by a collar attached to said blades having inside spurs sliding in spiraled grooves cut in the axles as far as a stop fixed on said axles, the sliding out of the blades under the centrifugal force increasing the angle of incidence, a blade with a rigid and narrow root resting free on said axles and the rest of the blade out to the tip being flexible and divided into several airfoils arranged in steps making slots between them, the designated gap of said slots being maintained by suitable ties spaced along said blade; an air turbine mounted in the path of the slipstream on the rear of the above mentioned cylinder delivering inside the turret with suitable gears and shafts the energy of said turbine developed from the slipstream to drive the airscrew, which is also driven directly by the slipstream striking the flexible blades when passing at the rear.

3. In aircrafts of the helicoplane type, a multi-airfoil wing, a suction system and a positive air control each respectively as in claim 1; a cylinder solidly fixed on a streamlined base, housing the power plant over the center of the wing and establishing between said wing and cylinder an interior communication, two motors substantially mounted inside said cylinder driving, one a tractor propeller with a front spinner, the other a pumping device and an airscrew thru a geared transmission of the planetary system in which the sun gear is fixed on the crank shaft of said other motor, the planet gears drive the pumping device and the annular gear drives the airscrew, said annular gear having a drum and a band brake, a pumping device of a fan and blower combination discharging partly under the wing between the hulls and partly thru the tail surfaces for control, a streamlined turret fixed over the cylinder holding on suitable bearings a vertical shaft carrying an airscrew secured to the upper end of said shaft rotating over said turret, said vertical shaft being connected at the lower end with the annular gear of the transmission by a ratchet gear permitting the rotation of the airscrew when the annular gear is stopped, an airscrew formed by semi-flexible axles radially secured to a hub fixed at the upper end of the vertical shaft and semi-flexible blades carried on said axles with slidable bearings, said axles decreasing gradually in thickness toward the tip, slidable bearings formed by a collar attached at the root of said blades having inside spurs sliding in spiralled grooves cut in the root of the axles between the hub and a stop fixed on the axles at a designated distance determining the length of travel of said blades on the axles, said blades quite rigid at their root but gradually becoming flexible toward the tip being retained at rest against the hub by a pair of springs hooked on said hub and being slid out on the axles by the centrifugal force of the rotation, flaps hinged at the root of said blades on their trailing edge being articulated with rods attached to one arm of bell cranks fixed on the blades, the other arm of said bell cranks being attached to the axles, with rods where from the movement of the blades along the axles the flaps are moved up and down as the blades slide in or out, varying the angle of incidence of said flaps in much greater proportion than the rest of the blades; an air turbine mounted in the path of the slipstream on the rear of the cylinder delivering inside the turret, with suitable gears and shaft the energy of said turbine to drive the airscrew, which is also driven directly by the slipstream striking the blades when passing at the rear.

4. In aircrafts of the helicoplane type having a multiairfoil wing, a suction system and a positive air control each respectively as in claim 1; a cylinder having a streamlined base solidly fixed over the wing, said cylinder housing a power plant and communicating interiorly with the wing thru said base, two motors substantially mounted inside said cylinder, one motor driving a large tractor propeller on a geared hollow shaft, the other motor driving simultaneously the pumping device, the airscrews and a smaller tractor propeller with a spinner, said smaller propeller being driven thru a differential gear in front of the large propeller in close tandem and in opposite direction, the pumping device being geared directly with the crank shaft of said other motor, but the airscrews and small propeller being driven thru a differential gear of the planetary system in which the sun gear is driven by the motor, the planet gears drive indirectly the small propeller and the annular gear drives the airscrews, the planet and annular gears being carried on sleeves turning freely on the crank shaft and each having a drum and band for braking purpose, a pumping device of the fan and blower type combined discharging the air partly under the wing thru the lower surface, and partly thru conduits imbedded along the fuselage ending with slots in the trailing edge of the tail fins for positive control, a streamlined turret fixed over the cylinder holding on suitable bearings a vertical hollow shaft carrying two airscrews, one, the larger fixed to it right over the turret, and the other the smaller over the upper end of said hollow shaft secured to a second vertical shaft mounted inside the hollow one on suitable bearings, said two vertical shafts with their respective airscrews being driven from the transmission thru a second differential planetary gear system attached to the lower end of the vertical shafts in which the annular gear is driven from the transmission, the planet gears drive the lower or larger airscrew and the sun gear drives the smaller airscrew thus maintaining rotation of the airscrews with the power braked or stopped, a large airscrew secured to the hollow vertical shaft and formed by axles radially hinged to a hub, said axles carrying flexible blades of a multiairfoil type on slidable bearings, cables attached with springs on said hollow vertical shaft some distance above the hub and attached to the blades to support their weight at rest and raise their trailing edge decreasing their angle of incidence, slidable bearings in both airscrews formed by a collar attached to the blades, said collar having inside spurs sliding in spiralled grooves cut in the axles as far as a stop on said axles, said blades of both airscrews being induced to slide out by the centrifugal force, the outward displacement along the axles increasing the angle of incidence of said blades, in the large airscrew the blades being rigid and narrow at the root, said narrow part only resting on the axles, the external part of said blades being flexible and divided into two or more airfoils positioned in steps and leaving slots between them, the designated gap of said slots being maintained by suitable ties spaced along the blades; a smaller airscrew fixed to the inside vertical shaft and superimposed over the large one turning in opposite direction to it, said smaller airscrew being formed by semi-flexible axles radially secured to a hub keyed at the upper end of a vertical shaft mounted inside the hollow one and semi-flexible blades carried on said semi-flexible axles with slidable bearings, said axles decreasing gradually in thickness toward the tip being quite rigid at the root but increasing in flexibility toward the tip and being retained at rest against the hub by a pair of springs hooked on said hub, said blades sliding out on the axles by the centrifugal force of the rotation; flaps hinged at the root of said blades of the small airscrew at the trailing edge and articulated with rods attached to one arm of a bell crank fixed on the blades and the other arm of said bell crank attached to the axles with another rod, whereby the movement in or out of the blades along the axles turns the flaps up or down, thus varying the angle of incidence of said flaps in much greater proportion than the rest of the blades; an air turbine mounted in the path of the slipstream on the rear of the cylinder delivering inside the turret with suitable gears the energy of said turbine to the hollow vertical shaft, hence driving both airscrews thru the differential gear system even if the annular gear of the transmission is braked the large airscrew being also directly driven by the slipstream striking the blades when passing at the rear.

5. In aircrafts of the seaplane and airplane type, a wing formed by several airfoils positioned in steps going down toward the trailing edge and leaving between them a gap or slot, a flexible membrane or frieze appended to said airfoils having their trailing edge in the slots, air conduits built in and imbedded in said airfoils having a series of valves drawing the air by suction from the upper surface thereon, a pumping device of a fan and blower combination developing internal suction in the wing and in the cylinder housing the motors, registers regulating said suction on the wing, other conduits imbedded in the fuselage or hull leading a part of the air discharged by the pumping device to the tail fins released thereout thru slots in the trailing edge of the vertical and horizontal fins, hinged rudders and elevators lying in the discharged stream with the hinge joints some distance back from their leading edge to balance the load and divert the whole stream on one side when said rudders and elevators are deviated from their neutral position, opening thru the lower surface of the wing at the center to discharge a part of the air from the pumping device downwardly between the hulls, a cylinder housing the power plant and communicating with the pumping device thru its base, two motors substantialy mounted inside said cylinder: one motor driving a tractor propeller in front with a spinner attached, the other motor driving a pusher propeller closely adjacent to the edge of the cylinder at the rear and driving also the pumping device above mentioned with a suitable transmission system permitting to drive the pumping device with the pusher propeller stopped; a system to operate the registers with the normal control of the ailerons, comprising a bar sliding in a pivoted sleeve, one end of said bar being attached to the cables interconnecting the ailerons and the other end articulated with the registers by means of rods, a control lever connected to said sliding bar by cables on pulleys with a spring to take up the slack, with the lever advanced both registers becoming and staying closed and with the lever pulled back the two registers staying open when the ailerons are in neutral position, but closing alternatively on the side on which the aileron is turned up, thus effecting a dual control from the ailerons and the suction.

6. In aircrafts of the blimp-airplane type, a wing formed by several airfoils positioned in steps going down toward the trailing edge of said wing and leaving a gap or slot between them, rigid air conduits forming the spars of said airfoils, valves in said conduits drawing the air by suction from the upper surface thereon, gas bags contained inside the envelope of the airfoils, said envelope being fastened with cables from spar to spar, a central air chamber inside the fuselage in communication with all conduits housing a pumping device comprising a large fan driven by several motors; two cylinders one on each side of the nose housing the propelling power plant and communicating with the air chamber, a group of suitable motors in each cylinder geared to a common hollow driving shaft mounted therein on suitable bearings, a large propeller driven in front of said cylinders by said hollow shaft, another group of motors behind the first group inside the cylinders driving a second shaft inside the hollow one, a smaller propeller and spinner driven by said second shaft in close tandem with the large propeller and in opposite direction, said second shaft driving also a fan between the two groups of motors for cooling purpose and development of suction around the propellers; fins or legs attached to the fuselage carrying a suitable landing gear, stretchable pants surrounding said landing gear having the bottom edge formed by two large cups held around the wheels close to the ground on landing, interior conduits in said legs establishing communication between the cups and the central air chamber, another large conduit built with the main structure of the fuselage carrying the whole discharge of the pumping device to the tail fins where said discharge is released out thru slots in the trailing edge of the vertical and horizontal fins, hinged rudder and elevators lying in the discharged air flow with their hinge joints some distance back of their leading edge to balance the load and shift the whole stream on one side when said rudder and elevators are deviated from their neutral position; two suitable registers at the entrance into the central air chamber of the conduits leading to the wing to regulate the suction on said wing, suitable connections with the cables of the ailerons causing said registers to close alternatively on the side on which the aileron is raised up or to shut both registers and isolate them with the movement of said ailerons, other registers opening or closing two conduits, leading to the cups around the wheels thus sending the suction to said cups causing them to contact with the ground effecting a strong temporary braking or anchoring of the aircraft, gates closing the communication with the cylinders when landing with the motors throttled down, and a large gas bag retained by a suitable envelope on the upper part of the fuselage.

JOSEPH J. LERAY.